Figures 1, 2:
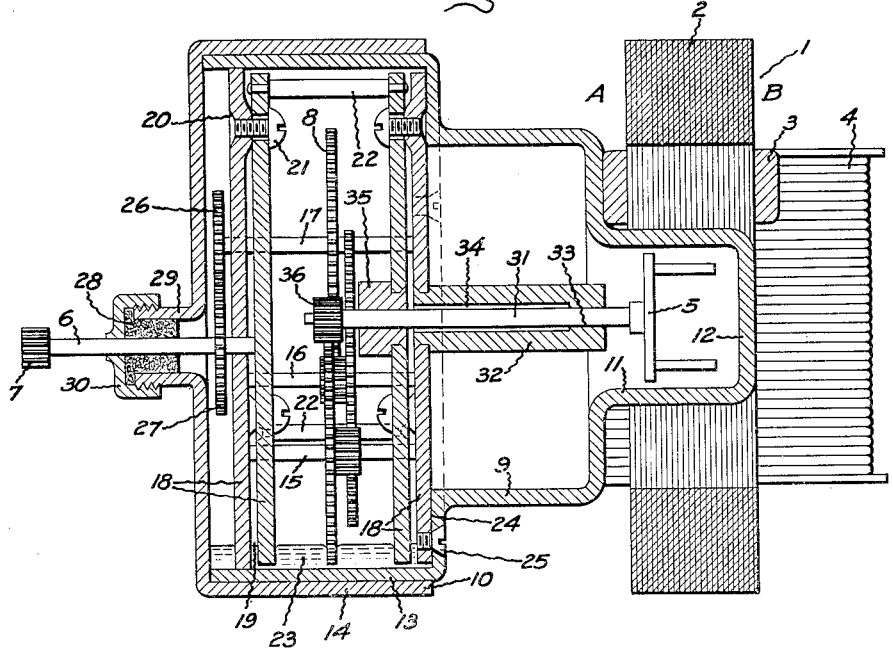

May 22, 1923.

H. E. WARREN

MOTOR DRIVE

Original Filed Sept. 1, 1920

Inventor:
Henry E. Warren,
by
His Attorney.

Patented May 22, 1923.

1,456,082

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

MOTOR DRIVE.

Original application filed September 1, 1920, Serial No. 407,487. Divided and this application filed January 17, 1922. Serial No. 530,005.

*To all whom it may concern:*

Be it known that I, HENRY E. WARREN, a citizen of the United States, residing at Ashland, in the county of Middlesex, State of Massachusetts, have invented certain new and useful Improvements in Motor Drives (division of Serial No. 407,487, filed September 1, 1920), of which the following is a specification.

This invention relates to a motor drive, and more particularly to a drive comprising means for producing mechanical motion, such as a motor, and transmitting mechanism adapted to modify the character of the motion produced by the motor at the point where the power is to be used.

My invention finds particular application to that class of drives used for transmitting motion to the hands of synchronous motor driven secondary clocks. The main object of my invention is to provide a device of the character indicated, inexpensive to manufacture, and exceedingly compact. Another object of my invention is to provide a device for modifying the speed of the motor which is easily adjustable for different directions of rotation and for different shafts alignments and which may be quickly and easily replaced.

Other objects and advantages, consisting in various improvements and modifications pertaining to motor drives, will hereinafter be more fully described and claimed.

The construction and mode of operation of my invention may be understood from the description taken in connection with the accompanying drawing, in which Figure 1 is a sectional view showing the various elements of both the motor and the transmitting mechanism; and Fig. 2 is an outline side view showing more clearly the relation between the motor and the enclosing case of the drive.

Referring now more in detail to the drawing, in which like reference characters refer to like parts throughout, my invention may be used in conjunction with a motor 1, which I show in this case as a synchronous, self-starting motor described in Letters Patent 1,283,432, granted in my name and assigned to the same assignee as the present application. It is of course to be understood that although I show my invention in connection with this type of motor, it may be used with all sizes or types of machinery or motors, such as non-electrical motors or prime movers. The particular motor shown comprises a series of stationary laminations forming the stator or field 2 and a plurality of shading coils 3. The field 2 carries a coil 4 which serves as the exciting means. I have shown a rotor 5 located in the space between the poles of the field 2 and adapted to be rotated upon energization of the coil 4 as is well understood. By the aid of my invention the speed of this rotor 5 is reduced, and the power is made available at the power shaft 6 which carries in this instance a driving pinion 7. This driving pinion may operate the load for which the apparatus is designed; in this instance, the hands of an electrically actuated clock may be driven. In other instances, however, much greater forces may be efficiently transmitted by appropriate design of the transmission.

Between the shaft 31 of rotor 5 and the power shaft 6 there are interposed a plurality of gears designated in general by the numeral 8. These gears modify the speed of the rotor 5, and illustrate but one means for accomplishing this result. All of the gears are totally enclosed in a gear case 9 and its cover 10. The particular construction of this gearing will be described later on. The gear case 9 has a cylindrical portion 11 closed at the end by the wall 12. This cylindrical portion totally encloses the rotor 5 as shown and is held to the stator, in this case, frictionally held within the inner periphery of the stationary portion of the motor. This method of holding the entire gear case to the stator of the motor permits the motor 1 to be reversed in relation to the gear case. That is, the side of the motor marked "A" may be made to take the position now held by side "B," and vice versa. This reversal causes a reversal of the direction of rotation of the rotor, and a reversible drive is obtained. This feature also facilitates the replacing of gear units for the purpose of repair. It will be understood that the units comprising the casings 9 and 10 and the containing parts may be made up for different gear ratios without interfering in any way with their interchangeability.

The cover 10 for the gear case 9 is held in place by any appropriate means. In this instance I provide for this purpose interengaging cylindrical portions 13 and 14 carried respectively by the gear case 9 and the cover 10. These two cylindrical portions 13 and 14 may be held together simply by friction, by making their engaging surfaces of the proper size. In this way it is possible to slip the cover 10 over the gear case 9 with great facility. The power shaft 6 extends through the cover 10, and in order that the entire case be oil-tight, I provide a packing 28 for this shaft. The packing may be either felt or cork, and is appropriately held in place between the threaded cap 30 and the mouth-shaped projection 29 formed on the cover 10. It is to be noted that the axis of shaft 6, while parallel with that of rotor 5, is displaced therefrom. It is thus possible, by an angular adjustment of the entire gear case to compensate for the varying sizes of gears with which pinion 7 may mesh. This angular adjustment is conveniently accomplished in the present instance by rotating part 11 of the case within the inner periphery of the stationary member 2.

The elements making up the gearing 8 will now be described. In order to reduce the friction as much as possible and to provide sufficient lubrication appropriate means are used to supply the oil to the bearing surfaces of these elements. These means provide a capillary space or passageway between an oil well and the engaging sliding surfaces of the bearing and the shaft journaled therein. Oil from the well is carried, by capillary attraction, to the sliding surfaces. I shall now describe how I provide the capillary space. As shown clearly in Fig. 1, the bearing supports for the various shafts designated by 6, 15, 16, and 17 which serve to support the gears, comprise a pair of metallic members or plates 18, separated by capillary space 19. This separation may be produced in any well known way; in this instance by the use of a plurality of small projections 20 punched in one of the two plates 18; appropriate fastening means such as screws 21 are provided for holding the two metallic members 18 together. In the drawing, for the sake of clarity, I have shown members 18 separated much farther than is necessary in actual practice. For keeping the two pairs of metallic members 18 spaced the proper distance apart, I provide appropriate means such as the spacers 22 riveted to the inside plates, as clearly shown in Fig. 1. In one or the other of the two plates 18 there is provided a bearing for each of the shafts used in the transmitting train. The plates 18 dip into the oil 23 which is appropriately held in a portion of the gear case 9, which serves as a well therefor. The level of this oil 23 is considerably below the level of any of the shafts supported in the plates 18 and the oil gets to these shafts by means of the capillary attraction through the capillary space 19. It is to be noted also that each of the two plates 18 serves to limit the thrust or sidewise movement of those shafts journaled solely in the other of said pair of plates. The entire structure comprising the bearing plates 18 and reduction gearing 8 is held to the gear case 9 against a flat annular surface 24 provided thereon by means of appropriate fasteners such as the screws 25.

The shaft 17 which carries the gear 26 meshing with the gear 27 serving to drive the power shaft 6 extends through both of the left-hand plates 18, as shown, so that the cover 10 may be removed without the necessity of disturbing the remainder of the mechanism. The power shaft 6 is journaled in the outer of the two left-hand bearing plates 18, as is clearly shown, and its axial movement is prevented in one direction by the inner plate and in the other direction by the inner surface of the gear case cover. The lubrication provided by the means described has been found to be ample.

In the present instance the rotor 5 is held in the field produced by the stator of the motor 1 by magnetic attraction. That is to say, the rotor shaft 31 has a longitudinal axial movement and is held in operative position meshing with the appropriate gear only when the motor is in operation. To provide a good bearing surface for the shaft 31 of the rotor I use a member 32, appropriately held to one of the metallic members or plates 18, such as by riveting, as shown, and having an outer bearing portion 33 accommodating the shaft 31. Connecting the sliding surfaces of the bearing and shaft at the portion 33 is an annular capillary space 34 which connects with the capillary space formed between the members 18. This capillary space is obtained by providing an aperture within the member 32 of the proper size, through which the shaft 31 extends. Thus a capillary space extends from the oil 23, between the two members 18, through capillary space 34, and to the sliding surfaces at the end of member 33. To provide a sufficiently long bearing for the shaft 31 at its left-hand end I use a bushing 35 fastened to the inner of the two metallic plates 18. By means of this construction the shaft 31 is extremely well supported near each end. When the rotor 5 is in its inoperative position, the shaft 31 may slide to the left and disengage the driving pinion 36 from its gear. However, when a current passes through the coil 12 there is a magnetic attraction sufficient to cause the shaft 31 to move to the right, so that the rotor 5 assumes a central position with respect to the field structure 2, and pinion 36 is reengaged with the first of the train of reduction gears 8.

It is thus seen that I provide an extremely inexpensive and compact device for modifying the speed of a rotor shaft, and for properly lubricating the moving parts. While I have shown in the accompanying illustration but one embodiment of my device, I do not wish to be limited thereto but aim to cover in the appended claims all modifications falling fairly within the scope of my invention.

What I claim as new and desire to secure by Letters Patent of the United States, is,—

1. A motor drive comprising a motor having a stationary part and a rotating element, a gear case enclosing the rotating element of the motor and held within the inner periphery of the stationary part of said motor, a cover for said case having an aperture, a power shaft extending through said aperture, and means supported in said case for transmitting motion from the rotating element to the power shaft.

2. A motor drive comprising a motor having a stationary part and a rotating element, a gear case totally enclosing the rotating element of the motor, that portion of which encloses the rotating element being held within the inner periphery of the stationary part of said motor, in such a way as to make the angular relation between the gear case and the motor adjustable, a cover for said case, and a power shaft extending from the gear case parallel with the shaft of the rotating element but having its axis displaced from the axis of said rotating element.

3. A motor drive comprising an electric motor having a stator element and a rotating element, a gear case enclosing and supporting the rotating element of said motor, adapted to be inserted and held within the inner periphery of said motor from either side in a position to bring the rotor element within the operative influence of said stator element, a power shaft extending through a wall of said casing and speed changing gearing supported in said case for transmitting motion from the rotating element to said power shaft.

4. An interchangeable speed changing unit for a motor, comprising an oil-tight casing provided with a cylindrical projection, a plurality of intermeshing gears supported in said casing, a rotor for the motor contained in the cylindrical portion of said casing and supported in driving relation with one of said gears and a power shaft in driving connection with another of said gears extending through an aperture in said casing.

5. A motor drive comprising a motor having a stationary part and a rotating element, an oil-tight gear case totally enclosing the rotating element of the motor, that portion of which encloses the rotating element being held within the inner periphery of the stationary part of said motor in such a way as to make the angular relation between the gear case and the motor adjustable, a horizontally disposed power shaft extending from the gear case parallel with the shaft of the rotating element but having its axis displaced from the axis of said rotating element, speed changing means in said casing for transmitting motion from the rotating element to said power shaft, a lubricant in the bottom of said casing, and vertically disposed partitions in said casing for rotatively supporting the rotating elements contained therein adapted to convey lubricant to said supports by capillary action irrespective of the angular adjustment of said casing.

In witness whereof, I have hereunto set my hand this 27th day of December, 1921.

HENRY E. WARREN.